US00RE34478E

United States Patent [19]

Dalebout et al.

[11] E Patent Number: Re. 34,478

[45] Reissued Date of Patent: Dec. 14, 1993

[54] EXERCISE MACHINES WITH DUAL RESISTANCE MEANS

[75] Inventors: William T. Dalebout; Curt G. Bingham, both of Logan, Utah

[73] Assignee: Proform Fitness Products, Inc., Logan, Utah

[21] Appl. No.: 721,082

[22] Filed: Jun. 24, 1991

Related U.S. Patent Documents

Reissue of:

[64] Patent No.: 4,981,294
Issued: Jan. 1, 1991
Appl. No.: 481,360
Filed: Feb. 16, 1990

[51] Int. Cl.[5] ..... A63B 22/12; A63B 22/06

[52] U.S. Cl. ..... 482/59; 482/62; 482/64

[58] Field of Search ..... 272/73, 131, 132; 188/77 R, 77 W, 264 A, 264 AA; 482/59, 62, 63, 65, 111; 74/572

[56] References Cited

U.S. PATENT DOCUMENTS

| | | | |
|---|---|---|---|
| D. 307,615 | 5/1990 | Bingham et al. . | |
| 4,036,333 | 7/1977 | Mathauser | 188/264 A |
| 4,291,872 | 9/1981 | Brilando et al. | 272/73 |
| 4,558,861 | 12/1985 | Gall | 188/77 R |
| 4,592,544 | 6/1986 | Smith et al. | 272/73 |
| 4,712,789 | 12/1987 | Brilando | 272/70 |
| 4,880,225 | 11/1989 | Lucas et al. | 272/73 |
| 4,889,335 | 12/1989 | Chen | 272/73 |

*Primary Examiner*—Stephen R. Crow
*Attorney, Agent, or Firm*—Trask, Britt & Rossa

[57] ABSTRACT

An exercise cycle having dual resistance structure as disclosed. An exercise cycle utilizing a pedal and crank and sprocket to drive a chain to a front mounted plastic wheel which employs a plurality of blades to form a fan to provide air resistance when the wheel is rotated. Additionally, the hub of the wheel is contacted with a strap to cover a significant portion of the circumference of the wheel whereby the strap may be tightened to increase the frictional resistance between the strap and the hub of the wheel to provide additional resistance when the front wheel is rotated by means of an exerciser pedaling the exercise cycle. A heat dissipation band covers the circumference of the wheel to dissipate heat due to the frictional resistance of the strap.

35 Claims, 3 Drawing Sheets

EXERCISE MACHINES WITH DUAL RESISTANCE MEANS

Matter enclosed in heavy brackets [ ] appears in the original patent but forms no part of this reissue specification; matter printed in italics indicates the additions made by reissue.

FIELD

The instant invention relates to exercise machines and, in particular, to stationary exercise cycles having a bladed wheel to provide wind resistance.

STATE OF THE ART

Stationary exercise cycles have long been made with various means of providing resistance to a wheel which is connected by a continuous chain to a sprocket having a crank with pedals on it. Early stationary exercise cycles utilized a wheel to which resistance could be applied by means of a pair of brake calipers of the type typically used on 10-speed bicycles. A more recent development has been the use of a strap in contact with the rim of the wheel of the bicycle to provide some resistance.

An example of an exercise cycle utilizing a strap member to provide pedalling resistance is illustrated in U.S. Pat. No. 4,592,544 to Smith et al. The "bicycle" wheel in this patent is placed horizontally beneath the pedals. The wheel has a circumferential groove in the peripheral edge of the wheel into which a strap is placed. Adjusting the tension on the strap adjusts the amount of force which must be applied to the pedals to cause the wheel to rotate at any given speed.

Also, exercise cycles have been made utilizing a bladed front wheel whereby the blades form a fan to provide air resistance to the front wheel as its being rotated.

Exemplary of an exercise cycle employing a bladed wheel is that illustrated in U.S. Pat. No. 4,082,264 to Santos. The wheel in this instance is attached directly to the pedal crank. The wheel is completely enclosed within a wheel housing. An air inlet and outlet provide for air ingress and egress to and from the wheel housing. More recent developments in air-resistant exercycles have utilized a traditional front wheel with blades as means to provide pedal resistance during pedalling of the exercycle.

SUMMARY OF THE INVENTION

The instant invention relates to exercise machines employing a resistance-inducing wheel which is actuated either directly or indirectly by an exerciser. Exercise machines employing a rotatable wheel generally include stationary exercise cycles, exercise rowing machines, exercise stair steppers and the like.

In the instant invention the wheel members provide resistance to an exerciser by both air-resistance means and friction means. The wheel members are generally made of plastic with air-resistance blade members and adapted to interact with friction means.

The instant invention relates to an exercise cycle (stationary exercise bicycle) which employs two means of resistance to the front wheel. One means of resistance is the use of blades or paddles radially positioned to function as spokes to support the rim to the hub of the wheel. Also, an adjustable strap which fits within a U-shaped groove in the rim of the wheel is used to provide additional resistance, especially at low speeds. The wheel, including the rim, of such an exercise cycle is preferably made of plastic. The invention further comprises the use of a metallic strip fixed within the outwardly projecting U-shaped groove in the rim of the wheel. The adjustable strap member contacts a metallicized band or metal strip which may act as a heat conductor to dissipate heat away from the point of friction between the adjustable strap and the metallic strip.

Provision of dual resistance means in the exercise cycle of the instant invention is especially useful inasmuch as dual propulsion means are provided to rotate the front wheel. An exerciser rotates the front wheel by means of his feet and hands. The exercisers feet propel the pedals of the exercise cycle which, through crank members attached to a drive sprockets, drives a continuous chain interacting with a sprocket connected to the hub of the front wheel. Also, the elongated handle bar members are reciprocated by the hands of an exerciser. The lower end of the handle bar members are connected by a long link member (arm shaft rod) which is connected to the cranks or pedals so that the reciprocal motion of the lower end of the handle bar members rotates the pedals, cranks and drive sprocket.

DESCRIPTIONS OF FIGURES

DETAILED DESCRIPTION OF INVENTION

The instant invention relates to an exercise cycle having a chain driven front wheel wherein the front wheel has radially positioned blades or paddles oriented with their broad faces facing forward so that the rotation of the front wheel creates significant air resistance against the paddles and consequently provides increased resistance to an exerciser pedalling the exercise cycle. A wheel having blade members to form a fan provides increased resistance proportional to the square of the speed of rotation of the wheel. Thus, at low speeds the wind resistance tends to be relatively low and it is not until the wheel has been caused to rotate at relatively high speeds that the wind resistance provide a significant resistance to an exerciser using the bicycle. The instant invention has been provided with an adjustable strap which fits within an outwardly projecting U-shaped groove on the rim of the cycle wheel so that additional frictional resistance may be experienced by the wheel during rotation to increase the resistance an exerciser experiences during low speeds as well as at high speeds of rotation of the wheel.

The instant invention may be more fully understood by reference to the attached illustrations.

Figure 1:
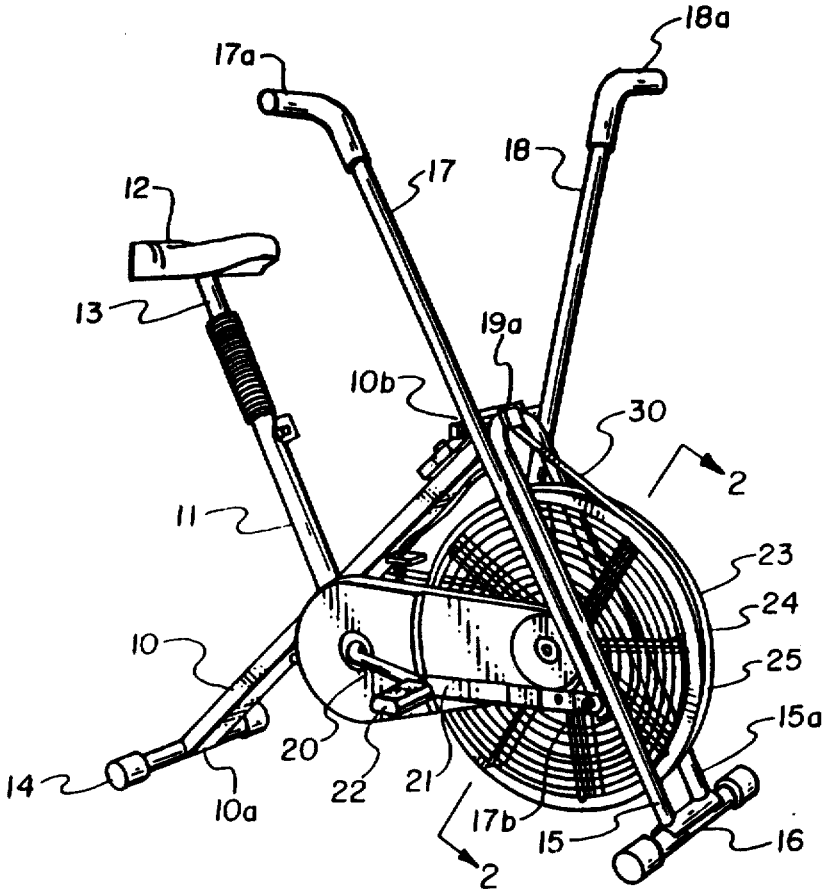
FIG. 1 is a perspective view of an exercise cycle of the instant invention.

FIG. 1 is a perspective view of the exercise cycle which has a main frame member 10, a seat column 11 attached to the main frame member to support a seat 12 attached to an adjustable seat post 13. The lower end 10a of the main frame member is attached to a transverse foot bar 14 which forms one support member for supporting the exercise cycle in an upright 15 position. At the forward end 10b of the main frame member a U-shaped front support (fork) 15 is attached, which in conjunction with front foot bar 16 which is attached to the lower end 15a of the front support member, supports the forward portion of the exercise cycle.

A pair of elongated handle bars 17 and 18 are rotatable attached to a transverse member 19 attached to the main frame near its forward end. The elongated handle bars, which are in the form of an inverted "J", have handle portions 17a and 18a and are rotatable attached at about their mid point to a transverse member 19 and interconnected with the pedal crank 20 by an arm or link member 21 which is rotatable attached adjacent to the pedal 22 and rotatable attached to a pin member passing through the lower end 17a of the handle bar to create an interconnection between the crank 20 and the handlebar so that as the crank 20 is rotated the free ends of the handle bar reciprocate, i.e. both upper and lower ends move backward and forward in a reciprocating motion. The reciprocation of the one handle bar to the other is 180° out of phase, i.e. as the top of one handle bar moves forward, the top of the other handle bar moves to the rear. The front wheel 23 is rotatable attached as its hub to an axle attached to the fork member 15.

The wheel 23 has blade members 24 which have wide faces positioned transverse to the rim 24 of the wheel. The blade members may have a thicker portion along the longitudinal axis to assist the blade members in acting as spokes radially attached to the central hub and to the rim. The blade members are preferably equally distantly spaced about the inner-circumference of the rim of wheel 23.

An adjustable friction strap member 20 is secured at one end to the front end 10a of the frame member 10. The strap encircles a significant portion of the rim 25 of the front wheel with its other end adjustably attached to frame member 10 at a point above the pedal cranks.

Figure 2:
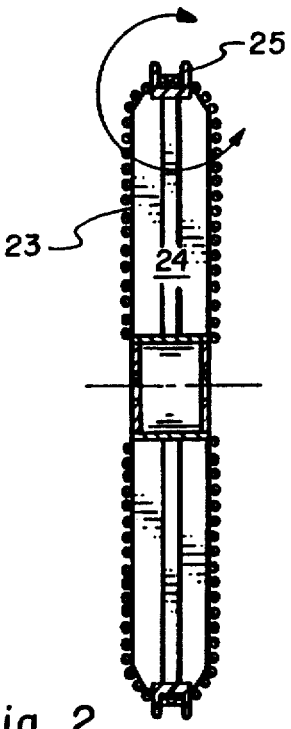
FIG. 2 is a sectional view along section lines 2—2 of the front wheel of the exercise cycle illustrated in FIG. 1 to illustrate the hub, blade members and rim of the front wheel.
Figure 3:
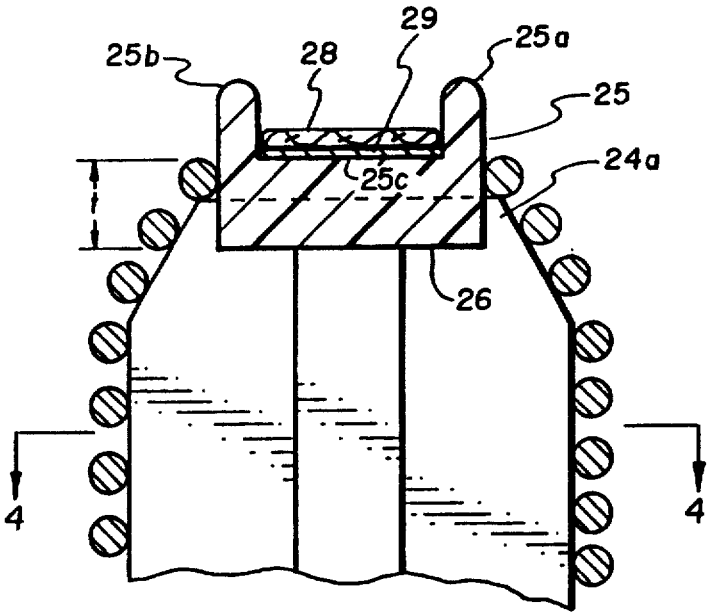
FIG. 3 is an enlarged sectional view of the rim and portion of a blade member of the front wheel sectional view illustrated in FIG. 2.

The rim 25 as illustrated in FIGS. 2 and 3 in a cross-sectional view along section lines 2—2 to show the outwardly directed U-shaped trough formed by the wall members (flanges) 25a and 25b and base 25c. The rim is generally made of plastic and has a substantial solid thickness between the base 25c of the U-shaped groove and the inner circumferential surface 26 of the rim. This thickness designated as "t" is required for strength of the rim and to provide sufficient structural support for the rim to accept the tip of the blade members 27. The coaction of the blade member 24 and slot 24a, not illustrated, formed in the inner peripheral surface of the rim is illustrated in FIG. 3.

The blade members are generally significantly wider than the rim as illustrated in FIG. 3 which is a frontal view of the interaction of a blade member and the rim 25. The blade member 24 in FIG. 3 is illustrated with its tip terminating short of the external periphery of rim flanges 25a. The blade, however, may extend to the outermost peripheral edge of flange 25a to provide increased air resistance.

Figure 4:
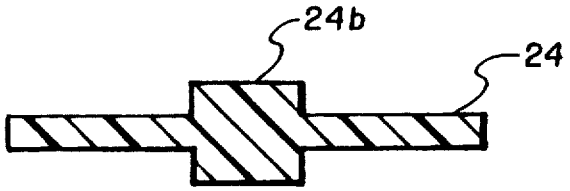
FIG. 4 is a sectional view along section lines 4—4 of the blade member illustrated in FIG. 3.

A cross section of a blade member is illustrated in FIG. 4. The blade has a thickened central portion 24b which runs the length of the blade to reinforce the blade so that it may perform the function of a spoke as well as an air-resistance member.

A metallicized or metal strip 28 is bonded to the base 25c of the U-shaped trough 25 formed in the outer surface of rim 24 by and adhesive layer 29. The metallic strip 28 is preferably a continuous strip encircling the rim. The metallic strip 28 provides a good heat conductor to transfer heat caused by friction between the metallic strip 28 and the friction strap member 30 which contacts a significant portion of the metallic strip. Metallic strip 28 provides an advantageous surface in comparison to plastic surface which would otherwise be exposed to the friction inducing strap.

The strip 28 is generally a metallicized plastic band or preferably a metal strip which provides a very smooth surface against which the strap 30 may interact as well as providing a heat conductor to dissipate heat away from the friction area. While a molded plastic surface generally appears smooth, any small imperfections on the surface could cause undue wear on the friction inducing strap 30. Also, the strip 28 provides a surface which does not soften as the plastic might under heat induced by the friction between the strap 30 and a plastic surface.

The machine includes brake means to resist movement of the wheel 23. One illustrated brake is a strap 30 which provides friction against the metallicized strip 28 on the wheel 23. It is preferably made of a fabric material, especially a woven tough fabric such as nylon, with an underlayment of felt or other softer less abrasive material which contacts the metallicized strip. The woven fabric strap and the underlayment are preferably stitched together. The strap 30 is generally fixed at one end and in the embodiment illustrated in the drawings the strap is attached at its upper end adjacent the junction of the inclined main frame member and the front fork. The strap 30 encircles the front wheel making contact with approximately 30 to 70%, usually about 50%, of the circumference of wheel and is attached to an adjustable cable through a mounting attached above the sprocket to the frame member 10 at a point above the sprocket hub. The adjustable cable is similar to a brake caliber cable where one end is attached to the adjustable strap and the other end is attached to a knob mounted on a control panel attached to the angular frame member near the upper portion of the frame within easy reach of an exerciser so that the tension on the strap may be readily adjusted while the exercycle is being ridden.

The adjustable strap provides a constant friction on the wheel regardless of speed of the wheel. Thus, at lower speeds an exerciser riding the exercise cycle will feel more resistance than would be provided by the blades of the wheel. Since the resistance experienced by the wheel blades is directly proportional to the square velocity or speed of the wheel when the speed is doubled, the resistance is quadrupled. At low speeds, however, there is very little resistance provided by the fan blades.

Thus, an exerciser may adjust the strap so that a high resistance is provided at lower speeds as the exerciser is beginning an exercise routine. As the exerciser speeds up his routine he may wish to adjust the strap to provide slightly lower resistance as the higher fan speeds are reached and a high resistance is provided by the fan blades. Also, if an exerciser is riding at a relatively high speed and wishes to simulate the increased resistance experience by riding up a hill on a bicycle then the adjustable strap may be adjusted to provide some increased resistance while the exerciser attempts to maintain a constant rotational speed of the front wheel.

Assuming that frictional resistance ($R_F$) equals air resistance ($R_A$) at a given speed, eq. 10 mph. Doubling the speed increases the air resistance to $4R_A$, thereby increasing the total resistance from $2R_A$ to $5R_A$ (since $R_A = R_F$ at the first speed, then $R_A$ can be substituted for $R_F$ in any resistance equation.) Thus, doubling the speed in this instance increases total resistance by only 2½ times rather than four times, giving a more gradual resistance increase.

The exercise machines of this invention employing a wheel with dual resistance means may be conventional exercise cycles with said wheel positioned vertically or horizontally. The drive means for such exercise cycles may be conventional pedals attached to a rotatable crank and inter-connected to the wheel by sprockets and continuous chain means or by a direct drive through a drive shaft and gears.

Also, the exercise cycle may be equipped with reciprocating handle bars which are hand-powered and attached either directly or indirectly to the wheel in a manner to translate reciprocal motion to rotary motion.

The exercise machine of the instant invention may be a rowing machine wherein handles (oars) are affixed to said wheel having dual resistance means to translate the reciprocal motion of said oars (handles) to rotary wheel motion in a manner similar to that illustrated in FIG. 1. Other exercise machines which may usefully employ a wheel member having dual resistance machines include stair-steppers, cross-country ski exercisers and the like wherein the reciprocal motion of foot-powered and/or hand-powered members may be translated into a rotary wheel motion by mechanisms similar to those described and illustrated herein with regard to hand-powered handle members affixed to an exercise cycle.

Friction may also be applied to a wheel having bladed air resistance members by brake calipers or by a single brake shoe. The plastic rim may be modified with a pair of thin, doughnut-shaped plasticized members to interact with the brake pads of a caliper brake. Also, a single brake shoe which fits within the U-shaped hub may be used instead of the flexible strap to apply friction to the blade wheel as it rotates.

Another useful embodiment within the scope of the instant invention includes securing the friction inducing strap within the U-shaped groove on the wheel hub and contacting it with a flexible metal, heat conducting strip The bladed wheel preferably has blade members which are significantly wider than its rim. The rim width of a U-shaped rim having an external groove or trough may vary from about one-half to about one and one-half inches, with a width of about one inch being typical. The U-shaped trough typically is at least about one-half inch wide since the friction strap members are typically about ⅜ to ½ inch in width, although narrower as wider strips may be effectively utilized. Since the rim width tends to block air flow to that portion of the blade member concealed by the rim it is preferred that the rim not be wider than necessary to accommodate the friction strap.

In the instant invention the width of the blade members may vary from about two inches to about four inches with a width of about 2½ to 3 inches being typical.

Figure 5:
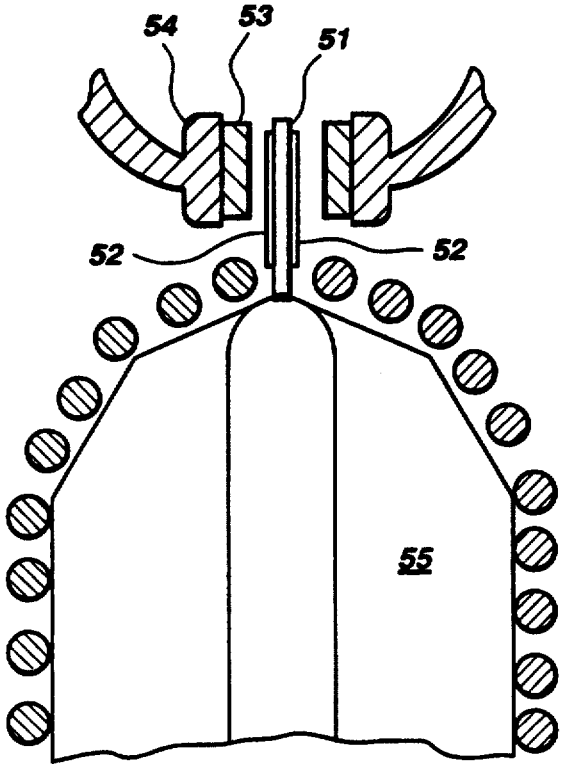
*FIG. 5 is a partial cross-sectional view of a wheel.*

The effectiveness of the blade members is generally enhanced by a narrowing of the rim member. A wheel structure which effectively utilizes air resistance and friction resistance is one wherein the rim is very narrow, from about one-eight to about one-fourth inch in thickness and is a circular fin, i.e. a thin annulus having a radial length of about one to about three inches. Friction resistance is readily applied by caliper-type brake members. Such a structure is illustrated in FIG. 5 wherein the rim 51 is a circular, thin disk having a large central opening. The rim of course could be a solid disk with blade members integrally molded to the rim. If desired, a U-shaped friction inducing strap may be used to contact the peripheral surface of the thin, fin-shaped rim.

In FIG. 5 the rim 51 may be made of metal or plastic. A heat conductive band 52 may be effectively used on one or both sides of the rim 51 to provide a smooth, heat conductive surface in contact with the brake pads 53 of the caliper brake 54. As illustrated in FIG. 5, the blade member 55 is shielded very little by the rim.

Since air resistance is in proportion to the square of air velocity, the peripheral portion (tip) of the blade, which have the greatest linear velocity, provide more air resistance per inch of area than inner portions of the blade members. Thus, a long blade with maximum tip width is preferred. Generally, the radial length of a blade is constrained by the structure of an exercise machine. Blades having a radial length of from about nine to about fifteen inches are typical.

Figure 6:
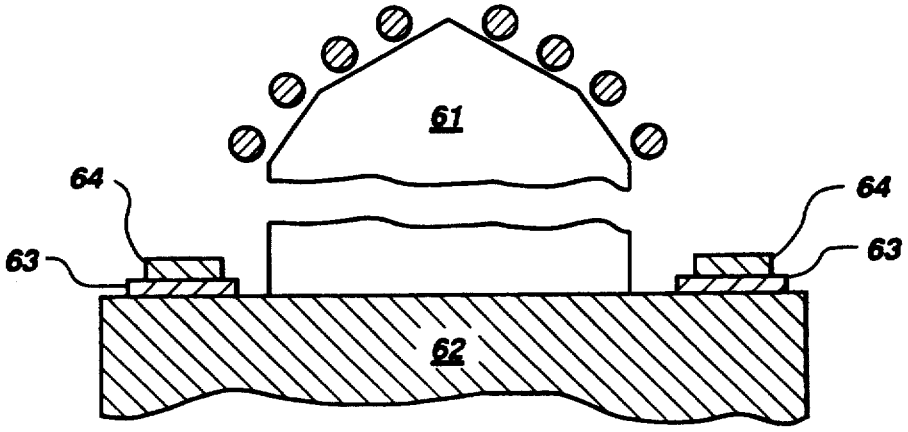
*FIG. 6 is a partial cross-sectional view of a wheel.*

A wheel structure having radial blade members with any significant rim interference is illustrated in FIG. 6. The blade members 61 may be free at their tip or a very thin rim such as that illustrated in FIG. 5 may be utilized. The hub 62 may be constructed with a diameter slightly larger than usual to provide a space for a pair of heat conductive strips 63 to be contacted by a spaced, pair of friction inducing straps 64. The friction inducing straps must be spaced sufficiently to permit blades 61 to pass between them. FIG. 6 illustrates only one blade attached to hub 62, however, numerous blades would be attached. The illustration of a single blade in FIG. 6 was solely for simplicity of illustration.

What is claimed:

1. An exercise machine comprising:

a frame;

a plastic wheel having a U-shaped external rim having a circular base surface and outwardly projecting sidewalls, said wheel rotatably adapted to said frame and having [radially positioned,] *radially-positioned* air [resistant] *resistance* blade members to resist rotational movement of said wheel;

brake means adapted to said frame to resist movement of said wheel;

drive means adapted to said frame for operation by a user to propel said wheel;

and heat dissipation means to dissipate heat generated by said brake means, said heat dissipation means being a smooth, thin, substantially continuous, [heat conductive-band] *heat-conductive band* member affixed to [the external] *said* circular base surface of [the] *said* U-shaped *external* rim.

2. The exercise machine of claim 1 wherein said brake means is an adjustable strap [which] *that* makes contact with said [wheel] *heat dissipation means.*

3. The exercise machine of claim 1 wherein said wheel has [an external rim and] a central hub and said air [resistant] *resistance* blade members are positioned to extend from said hub to said rim.

4. The exercise cycle of claim 1 wherein said wheel is affixed to said frame [in] *to rotate about* a horizontal [position] *axis.*

5. The exercise cycle of claim 1 wherein said exercise machine is a stationary cycle and said *plastic* wheel is affixed to said frame in a vertical position.

6. The exercise cycle of claim 5 wherein said drive means comprises a pair of pedals affixed to a rotatable crank which is [inter-connected] *interconnected* to said *plastic* wheel.

7. The exercise machine of claim 6 wherein said drive means includes a pair of handle bar members reciprocatingly attached to said frame and interconnected to said [drive means] *plastic wheel.*

8. An exercise cycle having a frame and a wheel assembly driven by drive means interconnected to a [pedal powered,] *pedal-powered* rotatable crank, the improvement comprising:

a light-weight plastic wheel having [radially positioned, air-resistant] *radially-positioned air resistance* blade members;

a U-shaped external rim on said front-wheel plastic wheel having a circular base surface and outwardly projecting sidewalls (flanges);

a smooth, thin [heat conductive], *heat-conductive,* substantially continuous band member affixed to [the] *said* circular base surface of said U-shaped external rim;

an adjustable strap member attached at each end to said frame and in contact with and encircling a [significant] *substantial* portion of said continuous band member, said strap member having adjustable tensioning means to increase the friction between said strap *member* and said heat conductive band when [the front] *said* wheel is rotated.

9. The exercise cycle of claim 8 wherein said heat conductive band is a [metallic surfaced] *metallic-surfaced* member adhesively bonded to [the] *said circular* base *surface* of said U-shaped rim of [the] *said* plastic front wheel.

10. The exercise cycle of claim 8 wherein said adjustable strap *member* is a flexible, woven fiber strap.

11. The exercise cycle of claim 8 wherein said adjustable strap *member* contacts at least about thirty percent of the circumference of said heat conductive band.

12. The exercise cycle of claim 8 wherein the width of said blade members is greater than the width of said U-shaped *external* rim.

13. The exercise cycle of claim [9] *8* wherein said heat conductive band is a thin metal band.

[14. The exercise cycle of claim 9 wherein said heat conductive band is a plastic band having at least its top surface coated with a very thin metal coating.]

15. The exercise cycle of claim 8 wherein said *lightweight plastic* wheel has a central hub and said blade members extend radially from said central hub to said *U-shaped* external rim.

16. The exercise cycle of claim 15 wherein [said] *each* blade [members have] *member has* a longitudinal portion [which] *that* is thicker than the remainder of said blade *member.*

17. The exercise cycle of claim 16 wherein said thicker longitudinal portion of said blade *member* is located substantially along the longitudinal axis of said blade *member.*

18. The exercise cycle of claim 8 wherein said [front] *lightweight plastic* wheel has at least six blade members.

19. The exercise cycle of claim 8 wherein said [front] *lightweight plastic* wheel has a pair of open grill members externally outboard of said blade members adapted to prevent intrusion of finger-sized foreign objects into said *lightweight plastic* wheel.

20. An exercise machine comprising:

frame means for positioning on a support surface;

drive means adapted to said frame means for operation by a user;

wheel means rotatably secured to said frame means and interconnected to said drive means for rotation thereby, said wheel means being formed of plastic with a hub, a plurality of air [resistant] *resistance* blades secured to and extending away from said hub and a rim positioned about the distal end of said air [resistant] *resistance* blades;

brake means positioned about said rim to resist movement of said wheel means, said brake means being a friction strap operable by the user; and heat dissipation means positioned about said rim to dissipate heat upon rotation of said wheel means by said drive means against the resistance of [the] *said* friction strap.

*21. An exercise machine comprising:*

*a frame;*

*a plastic-like wheel having a U-shaped external rim with a circular base surface and outwardly projecting sidewalls, said wheel being rotatably adapted to said frame and having radially-positioned air resistance blade members to resist rotational movement of said wheel;*

*brake means adapted to said frame and selectively positionable by a user to resist movement of said wheel with a desired amount of force;*

*drive means adapted to frame and interconnected to said wheel for operation by a user to propel said wheel; and*

*heat dissipation means to dissipate heat generated by said brake means, said heat dissipation means being a smooth, thin, substantially continuous, heat-conductive band member affixed to said circular base surface of said external rim and formed of material different than said wheel.*

*22. An exercise machine comprising:*

*a frame;*

*a plastic-like wheel rotatably adapted to said frame and having radially-positioned air resistance blade members to resist rotational movement of said wheel;*

*brake means adapted to said frame and positioned to resist movement of said wheel said brake means being selectively positionable by a user to enable adjustment in the amount of resistance applied to said wheel;*

*heat dissipation means to dissipate heat generated by said brake means, said heat dissipation means being a smooth, thin, substantially continuous, heat-conductive band member affixed to a circular base surface of said wheel and formed of material different than said wheel; and*

*drive means adapted to said frame and interconnected to said wheel for operation by a user to propel said wheel.*

*23. The exercise machine of claim 22 wherein said brake means is a caliper brake selectively positionable to resist movement of said wheel.*

*24. The exercise machine of claim 22 wherein said wheel has a rim with sidewalls.*

*25. The exercise machine of claim 24 wherein said brake means is positioned to contact said rim of said wheel and said brake means is a caliper brake.*

*26. The exercise machine of claim 22 wherein said brake means includes an adjustable strap positioned to resist movement of said wheel.*

*27. The exercise machine of claim 24 wherein said brake means is an adjustable strap which makes contact with the rim of said wheel.*

*28. The exercise machine of claim 22 wherein said wheel has an external rim and a central hub and said air resistance blade members are positioned to extend from said central hub to said external rim.*

*29. The exercise cycle of claim 22 wherein said exercise machine is a stationary cycle and wherein said drive means comprises a pair of pedals affixed to a rotatable crank.*

*30. The exercise machine of claim 29 wherein said drive means includes a pair of handle bar members reciprocating attached to said frame and interconnected to said wheel.*

*31. The exercise machine comprising:*

*a frame;*

*a plastic-like wheel rotatably adapted to said frame and having radially-positioned air resistance blade members to resist rotational movement of said wheel in proportion to the speed of rotation of said wheel;*

*brake means adapted to said frame and positioned to frictionally resist movement of said wheel said brake means being selectively positionable by a user to enable adjustment in the amount of resistance applied to said wheel;*

*heat dissipation means to dissipate heat generated by said brake means, said heat dissipation means being a smooth, thin, substantially continuous, heat-conductive band member affixed to a circular base surface of said wheel and formed of material different than said wheel; and*

*drive means adapted to said frame and interconnected to said wheel for operation by a user to propel said wheel.*

*32. The exercise machine of claim 31 wherein said wheel has a friction surface associated therewith, and wherein said brake means includes friction means positioned to contact said friction surface to resist movement of said wheel.*

*33. The exercise machine of claim 33 wherein said brake means is an adjustable strap which makes contact with said friction surface.*

*34. The exercise machine of claim 32 wherein said brake means is a caliper brake.*

*35. An exercise machine comprising:*

*a frame;*

*a plastic-like wheel rotatably adapted to said frame and having radially positioned, air resistance blade members to resist rotational movement of said wheel and to increase the resistance upon increasing the speed of rotation of said wheel; said wheel having a rim to which said blade members are attached, said blade members having at least a portion adjacent said rim that is wider than said rim;*

*brake means adapted to said frame and positioned to apply a frictional force resistive to movement of said wheel and that is essentially independent of the speed of rotation of said wheel said brake means being adjustable by a user to enable selective application in the amount frictional force;*

*heat dissipation means to dissipate heat generated by said brake means, said heat dissipation means being a smooth, thin, substantially continuous, heat-conductive band member affixed to a circular base surface of said external rim and formed of material different than said wheel; and*

*drive means adapted to said frame for operation by a user to propel said wheel.*

*36. The exercise machine of claim 35 wherein said brake means is an adjustable strap which makes contact with said wheel.*

* * * * *

UNITED STATES PATENT AND TRADEMARK OFFICE

CERTIFICATE OF CORRECTION

PATENT NO. : Re. 34,478

DATED : Dec. 14, 1993

INVENTOR(S) : Dalebout et al.

It is certified that error appears in the above-indentified patent and that said Letters Patent is hereby corrected as shown below:

In Column 2, line 16, change "sprockets" to --sprocket--;

In Column 3, line 38, change "20" to --30--;

In Column 5, line 48, insert a period after "strip";

In Column 6, line 45-46, change "having" (2nd occurrence) to --with--;

In Column 6, line 47, after "said" (1st occurrence) insert --plastic--;

In Column 6, line 47, after "wheel" insert --being--;

In Column 6, line 52, insert "plastic" after --said--;

In Column 6, line 55, after "said" insert --plastic--;

In Column 6, line 66, before "wheel" insert --plastic--;

In Column 6, line 68, after "said" (1st occurrence) insert --central--;

In Column 6, line 68, after "said (2nd occurrence) insert --external--;

In Column 7, line 1, after "said" insert --plastic--;

In Column 7, line 11, change "6" to --1--;

In Column 7, line 19, change "light-weight" to --lightweight--;

UNITED STATES PATENT AND TRADEMARK OFFICE

CERTIFICATE OF CORRECTION

PATENT NO. : Re. 34,478

DATED : Dec. 14, 1993

INVENTOR(S) : Dalebout et al.

It is certified that error appears in the above-indentified patent and that said Letters Patent is hereby corrected as shown below:

In Column 7, line 23, change "front-wheel" to –lightweight–;

In Column 7, line 26, delete the comma after "continuous";

In Column 7, line 39, after "said" (2nd occurrence) insert –lightweight–;

In Column 7, line 39, after "U-shaped" insert –external–;

In Column 7, line 40, delete "front";

In Column 8, line 36, after "to" (1st occurrence) insert "said";

In Column 9, line 15, change "reciprocating" to –reciprocatingly–;

In Column 10, line 4, change "33" to –32–;

Signed and Sealed this

Fourth Day of July, 1995

Bruce Lehman

*Attest:*

BRUCE LEHMAN

*Attesting Officer*

*Commissioner of Patents and Trademarks*